United States Patent
Macwan

(10) Patent No.: US 9,910,635 B2
(45) Date of Patent: *Mar. 6, 2018

(54) SYSTEM AND METHOD FOR CONNECTING TO ADDRESSES RECEIVED IN SPOKEN COMMUNICATIONS

(71) Applicant: Nuance Communications, Inc., Burlington, MA (US)

(72) Inventor: Sanjay Macwan, Marlboro, NJ (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/566,934

(22) Filed: Dec. 11, 2014

(65) Prior Publication Data

US 2015/0126168 A1    May 7, 2015

Related U.S. Application Data

(63) Continuation of application No. 11/866,557, filed on Oct. 3, 2007, now Pat. No. 8,923,491.

(51) Int. Cl.
| | |
|---|---|
| H04M 3/42 | (2006.01) |
| G06F 3/16 | (2006.01) |
| G10L 15/26 | (2006.01) |
| H04M 1/57 | (2006.01) |
| H04M 1/725 | (2006.01) |
| H04M 1/2745 | (2006.01) |
| H04M 3/493 | (2006.01) |

(52) U.S. Cl.
CPC .............. *G06F 3/167* (2013.01); *G10L 15/26* (2013.01); *G10L 15/265* (2013.01); *H04M 1/274583* (2013.01); *H04M 1/575* (2013.01); *H04M 1/7255* (2013.01); *H04M 3/42102* (2013.01); *H04M 1/274508* (2013.01); *H04M 1/72552* (2013.01); *H04M 3/4931* (2013.01); *H04M 2250/22* (2013.01); *H04M 2250/60* (2013.01)

(58) Field of Classification Search
CPC ........... H04M 3/4936; H04M 3/42221; H04M 2201/41
USPC ......... 379/88.01–88.03, 88.07, 88.08, 88.11, 379/88.14
See application file for complete search history.

(56) References Cited

U.S. PATENT DOCUMENTS

| | | | |
|---|---|---|---|
| 5,822,415 A * | 10/1998 | Gordon | 379/140 |
| 5,857,013 A | 1/1999 | Yue et al. | |
| 6,249,765 B1 | 6/2001 | Adler et al. | |
| 6,567,506 B1 * | 5/2003 | Kermani | 379/88.01 |
| 6,570,964 B1 | 5/2003 | Murveit et al. | |
| 7,092,496 B1 | 8/2006 | Maes et al. | |
| 7,113,572 B2 | 9/2006 | Holmes | |
| 7,251,313 B1 * | 7/2007 | Miller et al. | 379/88.01 |
| 2002/0196910 A1 * | 12/2002 | Horvath et al. | 379/88.01 |
| 2006/0104430 A1 | 5/2006 | Kirkland et al. | |

* cited by examiner

*Primary Examiner* — Nafiz E Hoque

(57) ABSTRACT

Disclosed herein are systems, methods, and computer-readable media to connecting to addresses received in spoken communications. The method for connecting to addresses received in spoken communications comprises receiving at least one spoken communication containing a spoken address, extracting each address automatically from the at least one spoken communication, displaying to a user at least one extracted address, and receiving from the user a selection of at least one extracted address to initiate communication.

20 Claims, 7 Drawing Sheets

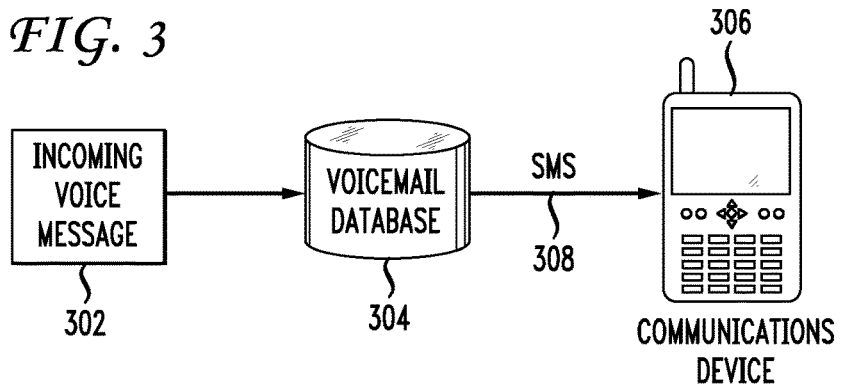
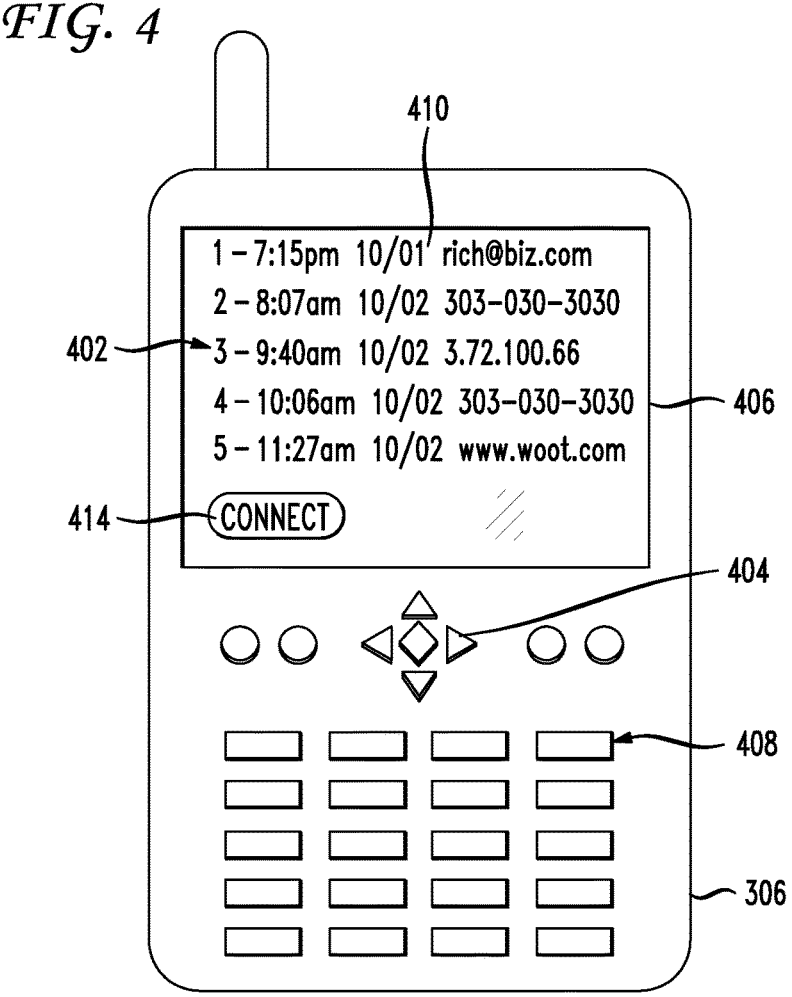

SYSTEM AND METHOD FOR CONNECTING TO ADDRESSES RECEIVED IN SPOKEN COMMUNICATIONS

PRIORITY INFORMATION

The present invention is a continuation of U.S. patent application Ser. No. 11/866,557, filed Oct. 3, 2007, the contents of which is incorporated herein by reference in its entirety.

BACKGROUND OF THE INVENTION

1. Field of the Invention

The present invention relates generally to identifying addresses such as phone numbers, email, and so forth, and relates more specifically to allowing a user to initiate communication with the addresses such as phone numbers or email addresses received in spoken communications.

2. Introduction

With the commercial success of cellular phones, many people have and use voicemail. Many telephone companies also offer voicemail for landlines that is remotely accessible from any phone. Voicemail acts as an answering machine in that it allows a caller to leave a recorded spoken message for the person called, in the event that the person called is unavailable. Often callers will leave a callback number or some other information, such as an address or an email address, in the message. In some cases, the callback number in the message will differ from the number called from and recorded in the caller identification information, making the caller identification information less valuable.

If voicemail is retrieved on the go, people can encounter difficulties in simultaneously holding a phone, paying close attention to the voicemail, and quickly writing down the phone number in the voicemail all while walking, driving, going through airport security, on a jobsite, etc. In addition, some environments, such as a construction site, concert, party, dance club, subway, or airport, may be too loud to clearly hear a voicemail message. In other words, the contact information may be available in a spoken form, but the spoken form of the information may not be conveniently accessible. Accordingly, what is needed in the art is a way to allow users to easily select and connect to address information in spoken messages with a minimum of effort.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

The present invention relates to voicemail and connecting to addresses contained in voicemail. Disclosed are systems, methods, and computer-readable media for connecting to addresses received in spoken communications by receiving at least one spoken communication containing a spoken address, extracting each address automatically from the at least one spoken communication, displaying to a user at least one extracted address, and allowing the user to select at least one extracted address with which to connect.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 illustrates an example implementation of the invention;

FIG. 4 illustrates a first exemplary communications device menu;

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
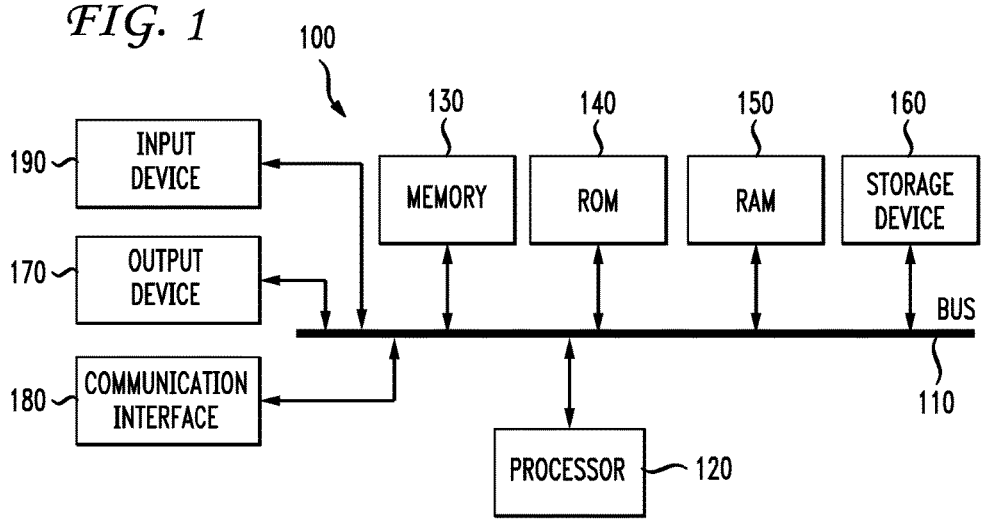
FIG. 1 illustrates a basic system or computing device embodiment of the invention.

With reference to FIG. 1, an exemplary system for implementing the invention includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS), containing the basic routine that helps to transfer information between elements within the computing device 100, such as during start-up, is typically stored in ROM 140. The computing device 100 further includes storage means such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output means. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative embodiment of the present invention is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

Figure 2:
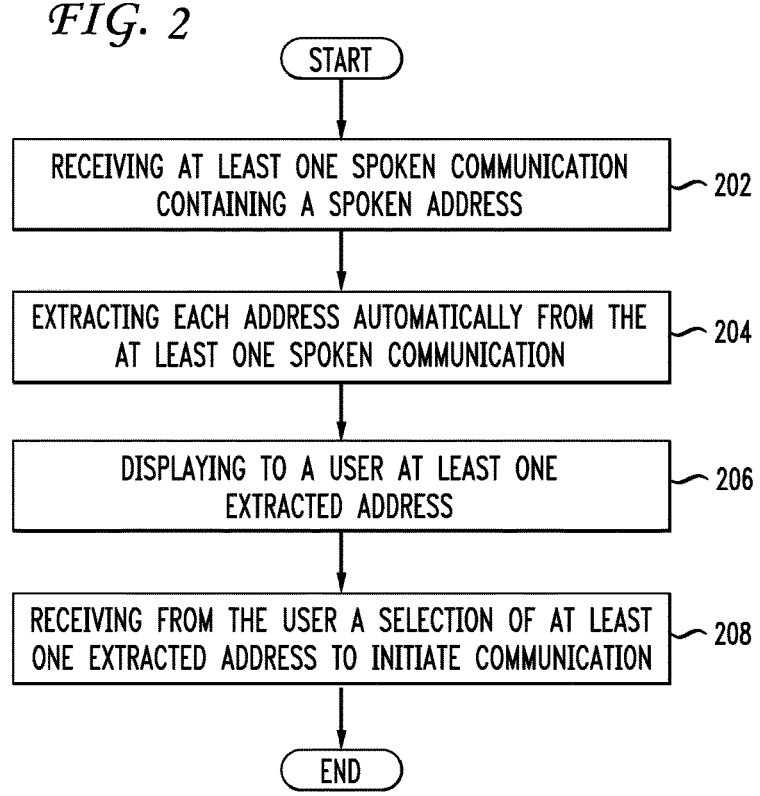
FIG. 2 illustrates a method embodiment of the invention.

FIG. 2 illustrates a method embodiment for connecting to addresses received in spoken communications, such as voicemail. First, the method receives at least one spoken communication containing a spoken address (202). For example, the spoken address could be a return phone number, an email address, a website, IP address, FTP server, instant messaging address (such as ICQ or AIM), GPS coordinates, a physical address, or other address information. The spoken communication may be stored for future playback, as is the case in a voicemail system, or it may be discarded.

Second, the method extracts each address automatically from the at least one spoken communication (204). Address information may be automatically extracted by transcribing the spoken communication into text and parsing the transcribed text corpus using any method known in the art to identify potential address information. As address information is identified, the information may be classified in to groups. For example, if the address information is a phone number, once the phone number is extracted from the spoken communication, it could be identified and classified as voice phone, voicemail, fax, pager, local phone number, long distance phone number, international phone number, toll-free phone number (1-800, 1-877, etc.), a premium phone number (like 1-900), including an area code, not including an area code, or any other groupings.

When the system extracts addresses from spoken communications, surrounding words or the context of the address may contain clues as to what kind of address it is. The system may perform a lexical analysis to provide additional information about the address. For example, if the message contained the phrase "Hi, this is John. Please call my office at 404-040-4040." then the phone number could be identified as John's work phone number. Additionally, if a list of contacts is available, the address could be identified and associated with John in the list of contacts, thereby providing access to additional information about John. If John were to provide information that is not contained in the list of contacts, that information could be integrated into John's entry in the list of contacts. As an example, if John included his work phone number and his email address in a voice message, and John's entry in the list of contacts did not contain his email address, the email address could be automatically added to John's entry in the list of contacts.

Third, the method displays to a user at least one extracted address (206). Displaying the extracted addresses may be accomplished during playback of the spoken communication, if the communication is recorded (like voicemail), immediately following playback of the spoken communication, or in a menu or series of menus on a communications device independent of the playback of the actual spoken communications.

Fourth, the method receives from the user a selection of at least one extracted address to initiate communication (208). This method may be practiced as part of a subscription-based service. For example, a cellular phone subscriber may pay an additional monthly fee for the use of this service. The method may be practiced as part of a pay-per-use service which could give customers an option to use this service when it is to their advantage without being required to pay extra every month.

One variation of this could include an indication if the address, such as a phone number, is found in a list of known contacts. For example, if John is already listed in the contacts list, then instead of displaying John's phone number by itself, John's name could be displayed alongside the phone number. Also, if the contact list contains multiple entries for contact information, associated information like a fax number, home phone, work phone, cell phone, email address, SMS option to identify phone, or home address could be selected as well.

In addition, a further analysis using external data, internal data, or a combination of the two may be made to improve the presentation of options for the user. For example, the system may determine, based on the time of day, to highlight or move to the top of a presented menu, the work phone number or the home phone number. If the time is during the workday, the work phone number may be moved to the top and made larger for an easier access to a tap-to-call input from the user for the most probable number to be dialed. In another example, the system may determine that the contact person has an address in another time zone and while the local time of the person receiving the voicemail is say 8 PM and after work hours, the contact person lives in a time zone in which it is 3 PM and still during work. Thus other data may be received and analyzed to simplify the user interaction.

Another aspect of the invention involves using other data, such as historical data, to determine whether to highlight or amplify any particular number. For example, if the user consistently chooses a recipient's cell phone on Fridays, although it is during business hours, the system may adjust the presented menu system to highlight the cell phone on Fridays if that is when the voicemail was received. However, if the recipient of the voicemail retrieves the voicemail later (assuming the voicemail was left on a Friday), say on a Monday, the normal prioritization of a menu of numbers may be implemented and a work number is presented first. Of course any address, email, SMS or other communication approach may be used in this scenario.

The historical data may be drawn by developing a database that includes extracted address information based on user, location, time and date and so forth. In other words, if the user typically calls on a weekend and leaves a particular number or address but a different one during the week, that data may be tracked and accessed in menu presentation decisions.

Data on the Internet may also be accessed and retrieved as part of the presentation. For example, if three numbers are retrieved from a contacts list, the system may do a check of data on the Internet or other source for current status of the numbers to confirm that they are still active and associated with the particular user. This may be a mechanism to engage in a dialog with the user to correct such numbers or to prevent alternate numbers from being included in a menu when they are stale and no longer used by that contact.

The user may connect to multiple extracted addresses simultaneously (such as a conference call) or serially. The act of connecting to extracted addresses may vary depending on the category of address. For example, connecting to a fax number could entail sending a fax; connecting to a voice phone would be a normal phone call; connecting to a GPS coordinate could locate the address on a map; connecting to a web site could mean automatically opening a browser and navigating to the web site; and so on. As an example, on a smartphone or other device capable of voice recording, such as a Blackberry®, Treo®, or iPhone®, a user may opt to record a voice message as an audio file, such as .WAV or .MP3, which can be emailed to the address indicated in the voicemail. Similarly, SMS messages or emails could be used to establish contact instead of placing a phone call.

FIG. 3 illustrates an example implementation of the invention. FIG. 3 should be interpreted as illustrative in the context of a voicemail system and not necessarily limiting the scope of the invention to a voicemail system. Incoming voice messages 302 are stored in a voicemail database 304. The voice messages may be transcribed and parsed for address information. Any discovered address information may be associated with the original message and stored in the voicemail database. When the communications device 306 queries the voicemail database, the voicemail database may send stored address information via Short Message Service (SMS) 308 or any other suitable means of transmission. While the voicemail database is shown in this example as existing separate and apart from the communications device, the invention may be implemented so as to completely or partially combine the voicemail database and the communications device.

FIG. 4 illustrates a first exemplary communications device menu for displaying address information. A communications device 306 may comprise navigation and selection buttons 404, a display 406, and a keyboard 408 or other user input device, such as a stylus or touch screen. In the event that the information for each entry in the menu is too wide to be displayed simultaneously on the screen, the text in each row may scroll side-to-side automatically, may scroll only when selected, or may not scroll at all. A cursor 402 or other pointing means may indicate which address in a list of addresses 410 currently has focus. A user may highlight or select one or more addresses from the list using the navigation and selection buttons or by touching the display if the display is touch-sensitive. The user may then click the connect button 414 to click-to-call the selected one or more addresses.

Figure 5:
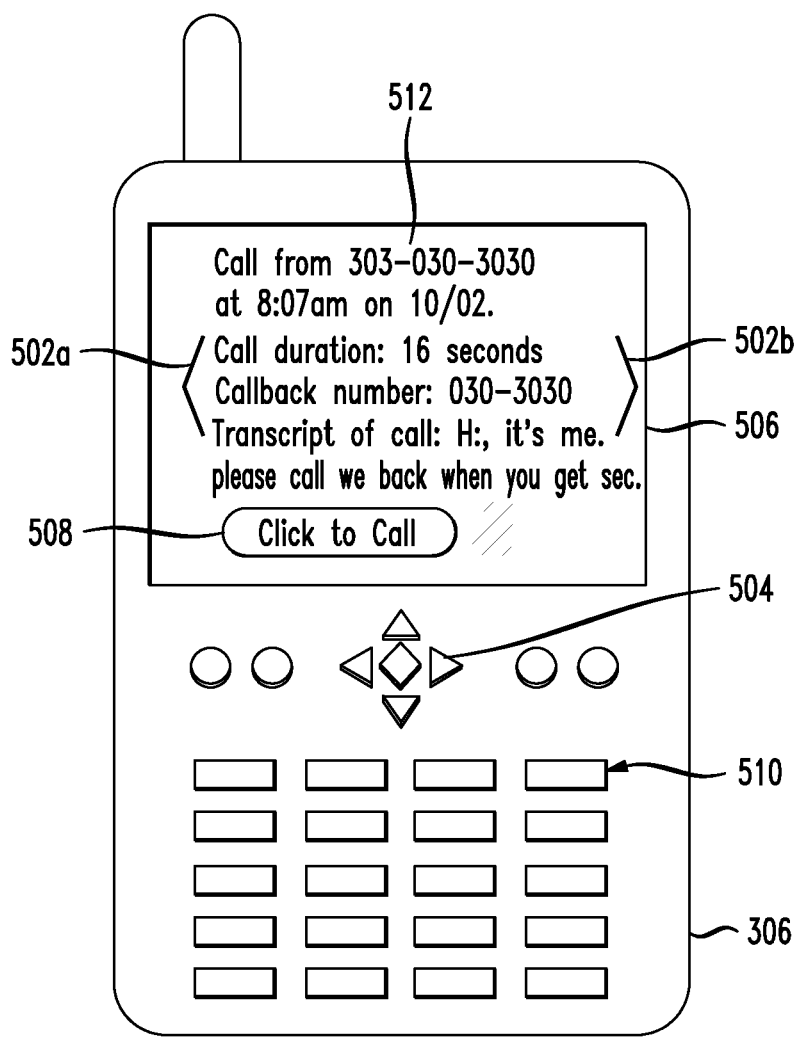
FIG. 5 illustrates a second exemplary communications device menu.

FIG. 5 illustrates a second exemplary communications device menu. A communications device 306 may comprise navigation and selection buttons 504, a display 506, and a keyboard 510 or other user input device, such as a stylus or touch screen. In this variation, only one address is displayed 512, but it is displayed in somewhat greater detail and larger fonts than the list of addresses in FIG. 4. Navigation means 502a 502b may be used to allow the user to navigate between addresses, or the address could simply be displayed during playback of its associated voice message. Navigation input from the user could be through the navigation buttons 504, a scroll wheel of some kind, touching a touch-sensitive screen, or even a voice command such as "next" or "previous". If the user wishes to initiate communication with the displayed address, he may press the "click to call" button 508.

Figure 6:
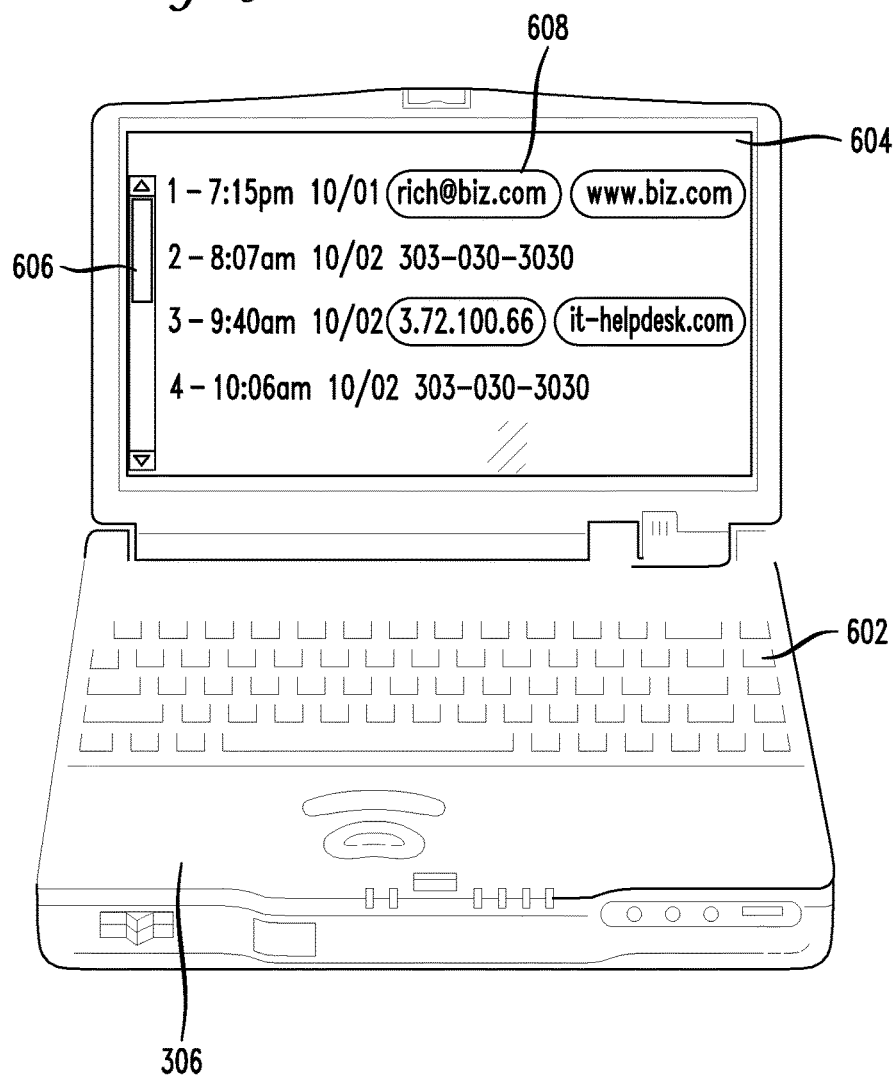
FIG. 6 illustrates a third exemplary communications device menu.

FIG. 6 illustrates a third exemplary communications device menu. A communications device 306 may comprise a keyboard 602 for user input and/or a touch sensitive display 604. A menu with navigation means 606 could be displayed. In this case, the menu could be organized to display all the addresses contained in one voice message in one row to make efficient use of a wide display. For example, if the voice message contains an email address and a phone number, they could be listed side by side in the same horizontal row. The user could click with a stylus on a touch sensitive screen or use the keyboard to navigate and select a menu option to call the phone number or to compose an email. Each address could be its own clickable button 608, allowing the user to click to call or connect to the address.

Figure 7:
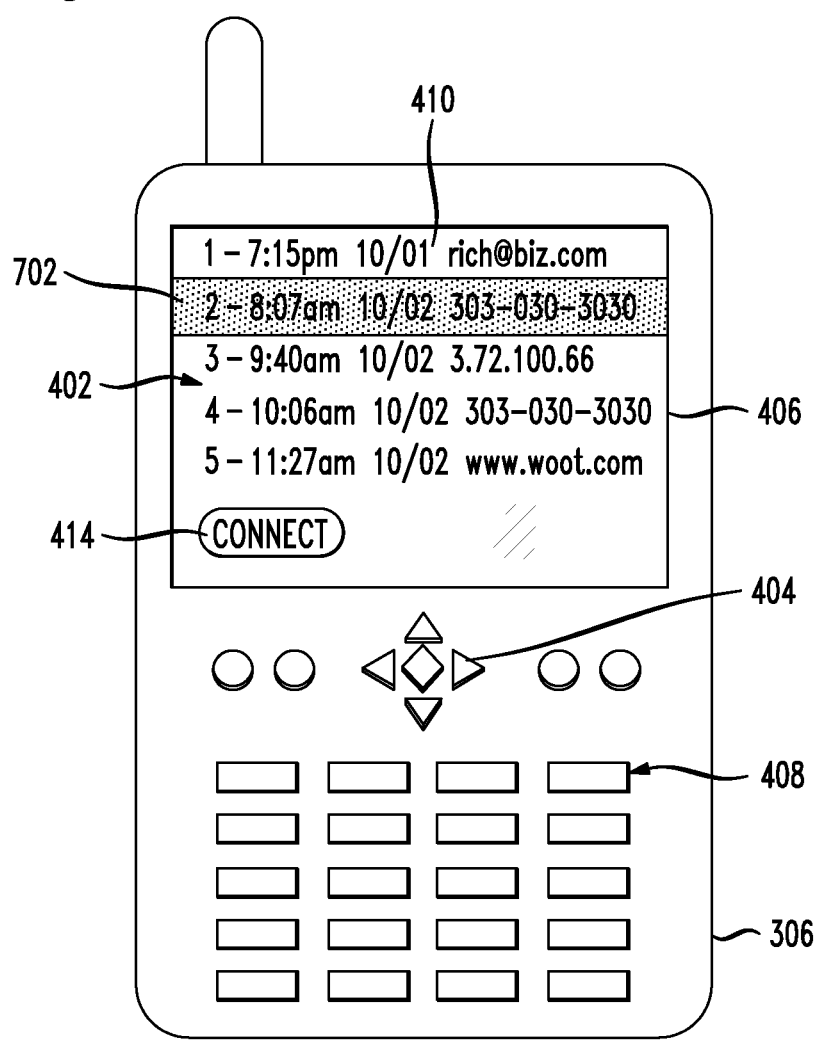
FIG. 7 illustrates a communications device menu with one menu entry highlighted.

FIG. 7 illustrates a communications device 306 menu with one menu entry highlighted 702. Multiple menu entries may be selected to subsequently establish communication. Once a menu entry is selected or highlighted, and the user clicks the connect or click to dial button, options may be presented to the user for establishing communications with the person who left the message based on the time of day, historical data, personal usage habits, individualized settings for each phone number (i.e. a user could indicate that any calls from Max are to be returned to his cell phone), etc. Highlighting or indicating selection of one or more menu entries may be accomplished in any number of ways known in the art. The text may be bold while the surrounding non-selected text is not bold. An icon indicating selection may be placed to the side of the menu entry. A specific color of text or background behind the text may be used to indicate selection. The selected entries may be placed at the top of the list. Checkboxes next to each menu entry, checked boxes indicating selection and unchecked boxes indicating lack thereof.

Figure 8:
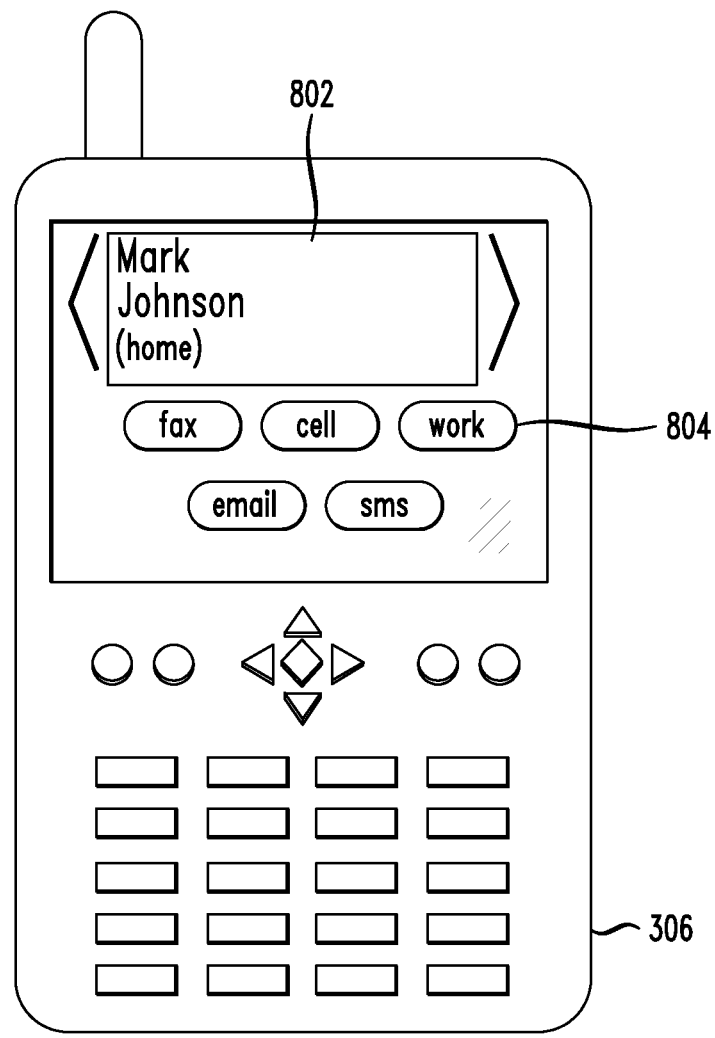
FIG. 8 illustrates a menu that prioritizes a particular communications method.

FIG. 8 illustrates how a menu that prioritizes a particular communications method. As discussed above, a communications device 306 may employ a menu that indicates one contact method as being primary, or favored. In the menu of FIG. 8, Mark Johnson (home) 802 is displayed in larger characters and at the top of the screen. Other contact methods 804, such as fax, cell phone, work phone, email, SMS, and so forth, may be listed below and in smaller characters because they may be perceived to be secondary or of less relevance. The system may determine which of the communication methods should be primary and which should be secondary as described in FIG. 9.

Figure 9:
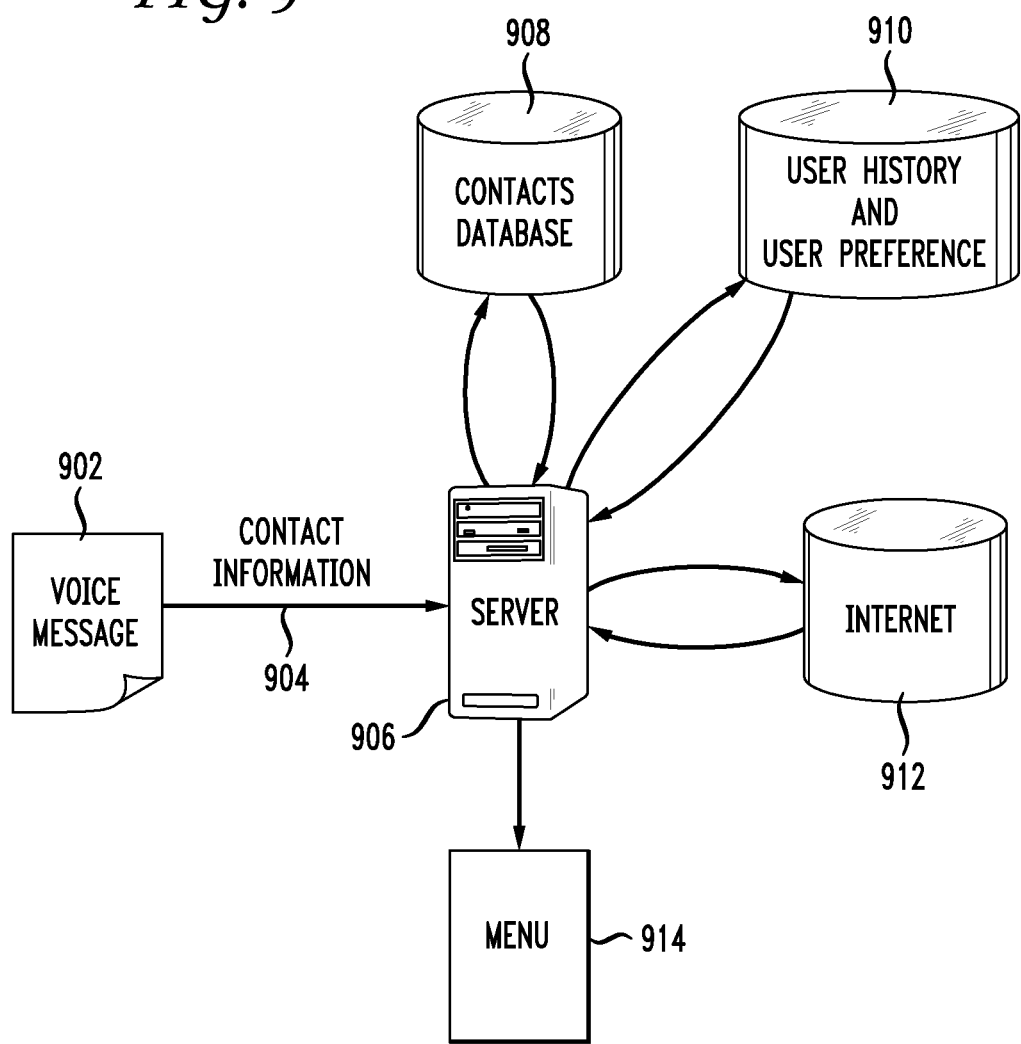
FIG. 9 illustrates how communications methods in a menu could be prioritized.

FIG. 9 illustrates how communications methods in a menu could be prioritized and ordered into primary and secondary communication methods. First, the system receives a voice message 902. Contact information is extracted from the voice message 904. As discussed above, contact information may include phone numbers, email addresses, web addresses, and so forth. A server 906 may store the contact information and query one or more contacts databases 908 to determine if the contact information is recognized. If the contact information is recognized, additional contact information that is not supplied in the original voice message may be associated with this voice message. For example, if a caller only mentions his cell phone, and that cell phone number is located in the contacts database, then all other contact information about the caller may be retrieved from the contacts database. The server may also query a user history and/or user preferences database 910 to determine which of the multiple contact methods is the best or preferred given the time of day, day of the week, type of message, etc. This database may track usage habits, rely on external data, or may be user-configurable. Either the user of a voicemail system could configure his or her own preferences, or, if the preferences database is global, a caller could register certain preferences about him or her self for the use of others. For example, a student may wish to register with the user preferences database that anyone attempting to reach him during class should send an email or a text message rather than call his cell phone.

The server may also query the internet 912 or other source of information to confirm that the contact information is not "stale," i.e. the information is still reliable. The server may take in to account information retrieved from these three, and other, sources when identifying the preferred contact method for the caller. Finally, the server may display the preferred, or primary, contact method prominently and secondary contact methods less so in a menu 914 on a communications device as described above.

Communications devices may include mobile phones, non-mobile phones with a display of some kind, general purpose computing devices with specific software or connecting to a voicemail database through a web interface, personal digital assistants, internet appliances, web sites, pagers, etc. Almost any device that is capable of sending communications to other devices and that has at least a rudimentary display and some way to accept user input could be adapted for use with the invention.

Separate, distinct embodiments include an on-the-fly approach rather than processing previously recorded speech. For example, many individuals leave an outbound greeting when they are out of the office. The outbound greeting may include a plurality of callback numbers for different situations, such as "You have reached Bob. I am out of the office. If you need help with network connectivity issues, call 123-1234. If you need hosting assistance, call 234-2345. If this is a customer outage emergency, please call 919-9111." The phone numbers could be extracted from the outbound message and presented to the caller in a manner consistent with the descriptions above, except in this case, the spoken communication is not a voice message left for the user, but is an outbound voice greeting which may be captured as text on the caller's communications device, thereby enabling the communications device to initiate contact with the appropriate number. In this regard, the caller, when she hears that an outbound message is gong to be presented, does not have to scramble to grab a pen to write down phone numbers. They can just listen to the message, the system will extract the phone numbers with an ID of each number and the user will be presented in a display or other interface the option to actually dial the selected number. If the user does not have a display certain device, once the data is extracted a voice interactive means in which simplified audio is presented after the outbound message. Such audio may be "press 1 for help with connectivity issues, press 2 for hosting issues, press 3 for a customer outage emergency." Therefore, the user merely has to wait for the conclusion of the outbound message and after processing the data, only needs to press a single number to dial the desired phone number.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, the invention may be applied not only to voicemail, but could also be applied to contests where individuals call and leave a message containing their email address, or could be applied to communications devices for the hearing impaired. Accordingly, the appended claims and their legal equivalents should only define the invention, rather than any specific examples given.

I claim:

1. A method comprising:
receiving a spoken communication from a first user at a device associated with a second user, the spoken communication comprising a first phone number;
generating a menu of contact information items for contacting the first user, wherein the contact information items comprises the first phone number and a second phone number;
determining an order of the contact information items, wherein the order is based on usage habits of the second user;
displaying for the second user the menu of the contact information items in the order; and
receiving from the second user a selection from the menu of the contact information items to initiate communication with the first user, wherein the selection is associated with contact information for which electronic communication is possible.

2. The method of claim 1, wherein the menu of the contact information items are displayed during playback of the spoken communication.

3. The method of claim 1, wherein displaying of the menu of the contact information items occurs immediately following playback of the spoken communication.

4. The method of claim 1, wherein the first phone number is one of a voicemail number, a fax number, a pager number, a local phone number, a long distance phone number, an international phone number, a toll-free number, and a premium number without area code.

5. The method of claim 1, wherein the method is performed as a subscription-based service.

6. The method of claim 1, wherein the method is performed as a pay-per-use service.

7. The method of claim 1, wherein
the selection comprises multiple items from the menu of the contact information items, to yield selected items; and
the method further comprises connecting to the selected items simultaneously.

8. The method of claim 1, wherein
the selection comprises multiple items from the menu of the contact information items, to yield selected items; and
the method further comprises connecting to the selected items serially.

9. The method of claim 1, wherein
the selection comprises multiple items from the menu of the contact information items, to yield selected items; and
the method further comprises connecting to the selected items, wherein connecting to the selected items is achieved by one of placing a telephone call, placing a conference call, sending an email, sending a fax, locating on a map, opening a web site, connecting to an internet protocol address, and sending an instant message.

10. A system comprising:
a processor; and
a computer-readable storage medium having instructions stored therein which, when executed by the processor, result in the processor performing operations comprising:
receiving a spoken communication from a first user at a device associated with a second user, the spoken communication comprising a first phone number;
generating a menu of contact information items for contacting the first user, wherein the contact information items comprises the first phone number and a second phone number;
determining, via a processor, an order of the contact information items, wherein the order is based on usage habits of the second user;
displaying for the second user the menu of the contact information items in the order; and
receiving from the second user a selection from the menu of the contact information items to initiate communication with the first user, wherein the selection comprises multiple items from the contact information items.

11. The system of claim 10, wherein the contact information items are displayed during playback of the spoken communication.

12. The system of claim 10, wherein displaying of the contact information items occurs immediately following playback of the spoken communication.

13. The system of claim 10, wherein the first phone number is one of a voicemail number, a fax number, a pager number, a local phone number, a long distance phone number, an international phone number, a toll-free number, and a premium number without area code.

14. The system of claim 10, wherein the operations are performed as a subscription-based service.

15. The system of claim 10, wherein the operations are performed as a pay-per-use service.

16. The system of claim 10, wherein the computer-readable storage medium has additional instructions stored which, when executed by the processor, cause the processor to perform operations comprising connecting to the multiple items simultaneously.

17. The system of claim 10, wherein the computer-readable storage medium has additional instructions stored which, when executed by the processor, cause the processor to perform operations comprising connecting to the multiple items serially.

18. The system of claim 10, wherein
the selection comprises multiple items from the menu of the contact information items, to yield selected items; and
the computer-readable storage medium has additional instructions stored which, when executed by the processor, cause the processor to perform operations comprising connecting to the selected items, wherein connecting to the selected items is achieved by one of placing a telephone call, placing a conference call, sending an email, sending a fax, locating on a map, opening a web site, connecting to an internet protocol address, and sending an instant message.

19. A computer-readable storage device having instructions stored which, when executed by a computing device, result in the computing device performing operations comprising:
- receiving a spoken communication from a first user at a device associated with a second user, the spoken communication comprising a first phone number;
- generating a menu of contact information items for contacting the first user, wherein the contact information items comprises the first phone number and a second phone number;
- determining an order of the contact information items, wherein the order is based on usage habits of the second user;
- displaying for the second user the menu of the contact information items in the order;
- receiving from the second user a selection from the menu of the contact information items to initiate communication with the first user, wherein the selection comprises multiple items from the contact information items; and
- connecting to the multiple items.

20. The computer-readable storage device of claim 19, wherein the menu of the contact information items are displayed during playback of the spoken communication.

* * * * *